May 16, 1961 J. B. LONG 2,984,333
CONVEYING MECHANISM

Filed April 21, 1959 4 Sheets-Sheet 1

INVENTOR
John B. Long

BY *Rommel, Allwine & Rommel*

ATTORNEY

May 16, 1961 J. B. LONG 2,984,333
CONVEYING MECHANISM
Filed April 21, 1959 4 Sheets-Sheet 2
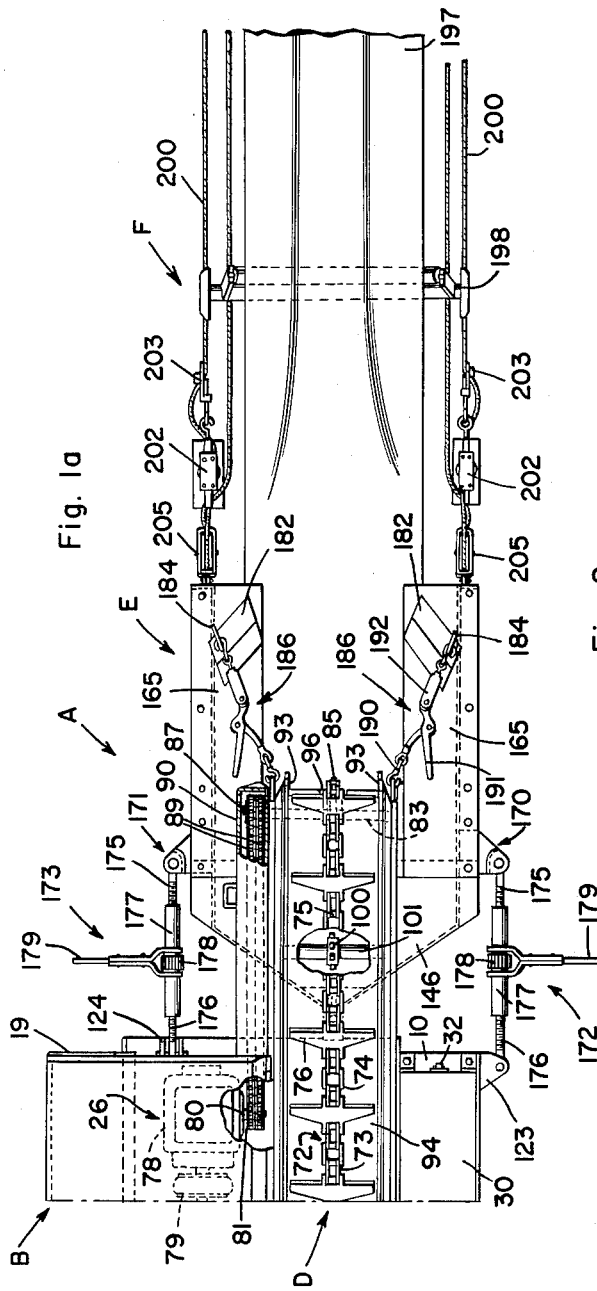
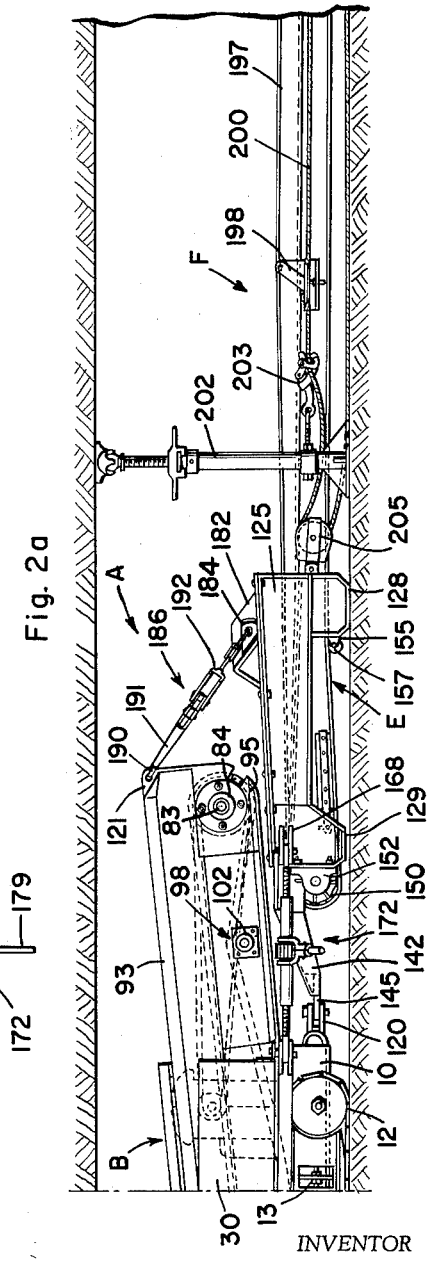
INVENTOR
John B. Long
BY *Rommel, Aldwin & Rommel*
ATTORNEYS May 16, 1961 J. B. LONG 2,984,333
CONVEYING MECHANISM
Filed April 21, 1959 4 Sheets-Sheet 3
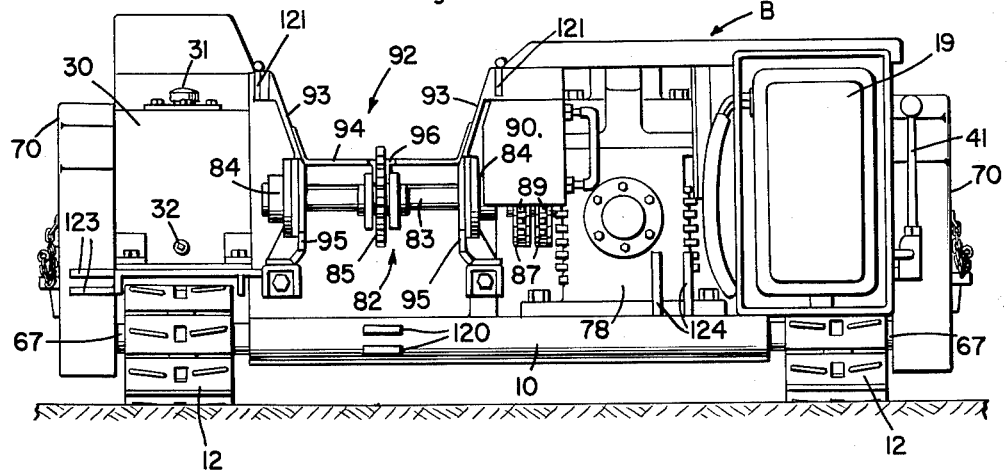
Fig. 3
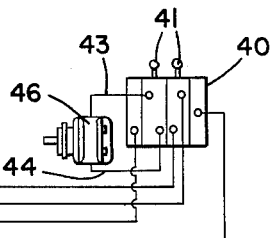
Fig. 4
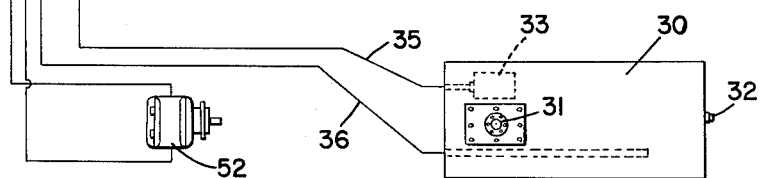
INVENTOR
John B. Long
BY *Rommel, Allwine and Rommel*
ATTORNEYS

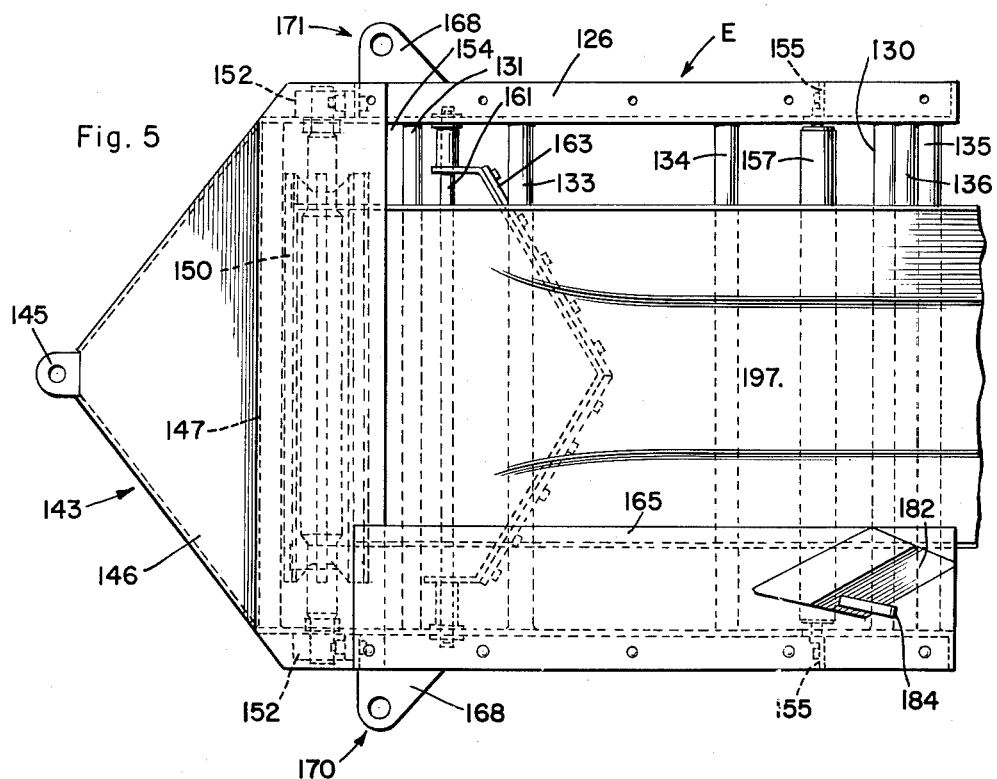
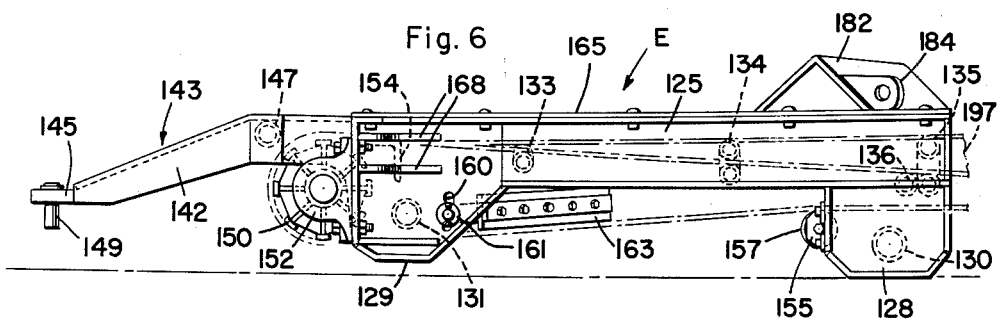
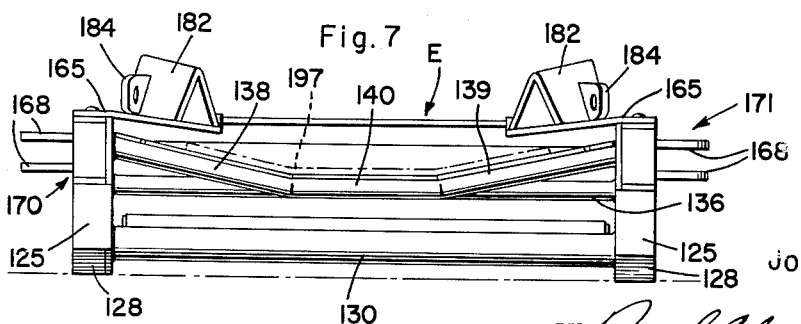

United States Patent Office 2,984,333
Patented May 16, 1961

2,984,333
CONVEYING MECHANISM

John B. Long, Oak Hill, W. Va., assignor, by mesne assignments, to Marmon-Herrington Company, Inc., Indianapolis, Ind., a corporation of Indiana Filed Apr. 21, 1959, Ser. No. 807,784

4 Claims. (Cl. 198—102)

This invention relates to improvements in conveying mechanism and particularly to improvements in conveying mechanism wherein a portion of the conveyor is extensible, but usually maintained in a fixed position during the conveying operation, and wherein apparatus, such as a loader, discharges at various points onto the conveyor.

In the art of conveying, such as for instance, the conveying of coal within a mine, the use of a belt conveyor having the conveying reach thereof supported upon spaced flexible strands of wire is rapidly supplanting both the flight and chain conveyors and the rigidly supported belt conveyors that have previously been used. This use of belt conveyors supported upon spaced flexible side strands has created quite a number of problems, particularly with respect to the supporting of the belt tailpiece so that it will be properly positioned and will function properly both during the time that the belt conveyor is being extended, and during the conveying operation.

The primary object of my invention is the provision of a mobile drive unit and belt tailpiece that are cooperatively interconnected to provide the proper support for the belt of a belt conveyor, during the extension or retraction of the belt conveyor and during the actual conveying operation.

A further object is the provision of an improved conveyor wherein a chain and flight conveyor and a belt conveyor are interconnected to provide a continuous longitudinally extending conveyor. I recognize that chain and flight conveyors and belt conveyors have been used in a cooperative conveying relationship previously, however, in such prior associations the chain and flight conveyor extended transversely outwardly from the belt conveyor, discharging onto the belt from a position substantially normal to the belt conveyor, and there has not been provided any cooperative relationship of a continuous longitudinal conveyor including a chain and flight conveyor and belt conveyor. In the previous associations of chain and flight conveyors and belt conveyors the belt conveyor is independently supported at each end thereof at a distance from the chain and flight conveyor, so that the belt conveyor merely passes beneath the discharge end of the chain and flight conveyor. My invention provides for the integral cooperative attachment of one end of the belt conveyor to the chain and flight conveyor, providing a continuous extensible conveyor including the attributes of the chain and flight conveyor and the belt conveyor.

A further object is the provision of conveying mechanism including a mobile drive unit having a chain and flight conveyor and a belt conveyor having the tailpiece thereof connected to the mobile drive unit in juxtaposition for the discharge of a load from the chain and flight conveyor onto the belt conveyor for the continuous longitudinal conveying of a load. In this relationship the chain and flight conveyor is provided for receiving a load from the loading machine, thus absorbing the initial impact of the load and providing initial inertia to the load, moving it longitudinally along the chain and flight conveyor, so that when the load is discharged from the chain and flight conveyor onto the belt conveyor the load will be moving in the direction of travel of the conveying reach of the belt conveyor and there will therefore be a substantially decreased wear upon the belt such as usually occurs when a static load is discharged onto the moving belt. Also, as the load is moving in the direction of the line of travel of the belt when it is discharged thereupon it is possible to provide a belt having a greater conveying speed than would be possible if a static load was applied thereto.

A further object is the provision of a mobile drive unit having a chain and flight conveyor, wherein the mobile drive unit supports a tailpiece for the belt conveyor in juxtaposition thereto so that as the mobile drive unit is trammed forward the belt tailpiece is mobilized, extending the belt, and when it is desired to retract the belt the mobile drive unit is trammed in reverse and will cooperatively support the belt tailpiece in juxtaposition for retraction of the belt therefrom.

A further object is the provision of a mobile drive unit having a chain and flight conveyor and a belt tailpiece of a belt conveyor interconnected thereto in such a manner so that the belt conveyor and the chain and flight conveyor may be properly aligned for continuous longitudinal conveying.

A further object is the provision of an improved tailpiece for supporting one end of a belt conveyor, the tailpiece having mounted thereupon braces extending transversely of the belt for preforming the troughing angle of the belt.

A further object is the provision of a tailpiece for a belt conveyor wherein means is provided upon the tailpiece for wiping the uppermost surface of the return reach of the belt free from any debris that may have accumulated thereupon, so that the surface of the belt is substantially clear of any foreign matter prior to the time that it is operatively contacted by the conveying idler rollers. Thus large particles of the material carried by the belt are prevented from entering between the belt and the belt supporting roller mounted on the tailpiece.

Other objects and advantages of the invention will be apparent during the course of the following detailed description, taken in connection with the accompanying drawings, forming a portion of this specification, and in which drawings:

Figs. 1 and 1ª constitute a broken view in plan of conveying mechanism constructed according to my invention, the tail section, intermediate pan sections, and a portion of the head section of the chain and flight conveyor and mobile drive unit being shown in Fig. 1, the remainder of the head section of the chain and flight conveyor and the remainder of the mobile drive unit being shown in Fig. 1ª, Fig. 1ª also including a belt tailpiece mounted upon the mobile drive unit in juxtaposition with respect to the chain and flight conveyor, and including a portion of a belt conveyor attached to the belt tailpiece.

Figs. 2 and 2ª constitute a broken view in side elevation of the asembly shown in Figs. 1 and 1ª.

Fig. 3 is an enlarged front view of a mobile drive unit having a chain and flight conveyor.

Fig. 4 is a diagrammatic view of the hydraulic system of the mobile drive unit.

Fig. 5 is an enlarged top plan view of the belt tailpiece, the loading plate to one side thereof being removed in order to more clearly disclose the preferred details.

Fig. 6 is a side elevation of the belt tailpiece, the belt being shown in dot and dash lines.

Fig. 7 is a front view of the belt tailpiece.

Figure 1:
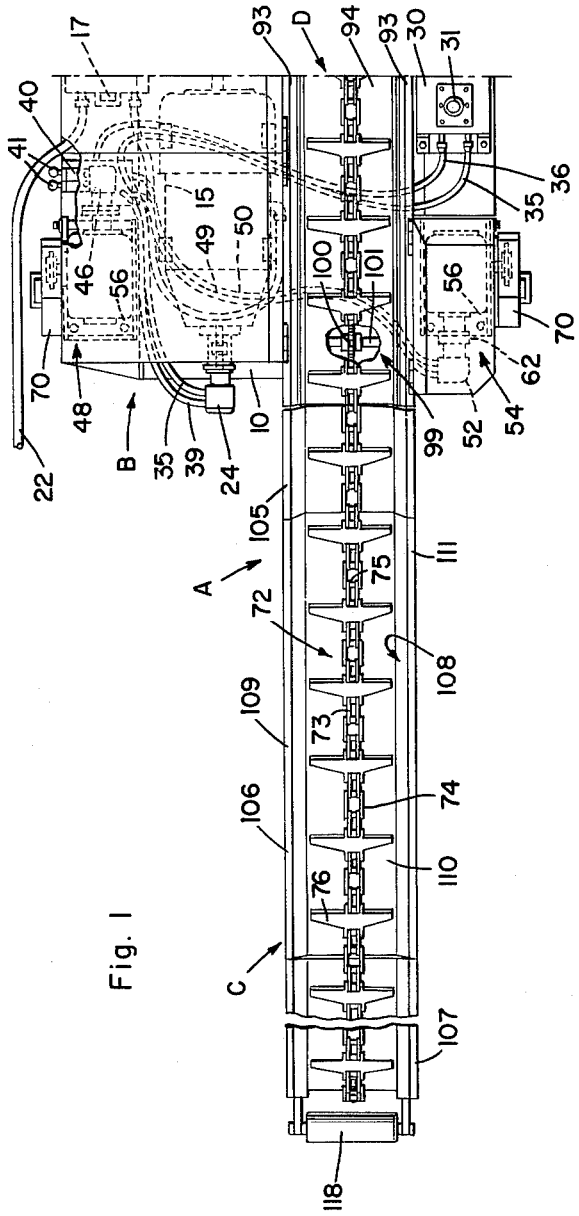

In the drawings, wherein for the purpose of illustration is shown a preferred form of the invention, and wherein similar reference characters designate corresponding parts throughout the several views, the letter A designates generally an elongated discharge conveyor which includes a mobile drive unit B having a plurality of pan units C extending from one end thereof, with a flexible traveling chain and flight conveyor D, supported in a suitable manner by the mobile drive unit B and the pan sections C; E a belt tailpiece secured to one end of the mobile drive unit B at the opposite end thereof from the pan sections C; and F an extensible belt conveyor secured to the tailpiece E.

The mobile drive unit B preferably comprises a frame 10 that is supported upon the crawler chains 12 in a conventional manner. The crawler chains 12 are independently movably mounted to each side of the frame 10 and an adjustment 13 may be provided upon the frame for adjusting the tension of the crawler chains, as is well known in the art. Mounted upon the frame 10 is a prime mover 15 which, in the showing in the drawings, is preferably an electric motor in an explosion proof frame. The electric motor is provided with controls 17, a starter 19, a cable 22 leading to the power source, and a suitable power take-off means for operating the hydraulic pump 24 and drive means 26, conventional controls being provided for alternatively operating the hydraulic pump 24 or the drive means 26.

The hydraulic pump 24 provides the motive power for the crawler chains 12. The hydraulic system, which includes the pump 24, is mounted on the frame 10 and includes a tank 30 having a filler cap 31, a drain plug 32, and an oil filter 33. Conduits 35 and 36 are provided leading to and from the hydraulic tank 30. The conduit 35 leads to the pump 24, and a conduit 39 is provided leading from the pump 24 to the control unit 40. This control unit 40 is provided with levers 41 for controlling the flow of hydraulic fluid through the conduits 43 and 44, to the hydraulic motor 46 that is connected to the crawler drive means 48 at one side of the mobile drive unit B; and is provided with conduits 49 and 50 leading to the hydraulic motor 52 that is interconnected to the crawler chain drive means 54 mounted on the opposite side of the mobile drive unit B; the conduit 36 being attached to the control unit 40 and completing the hydraulic system.

The hydraulic motors 46 and 52 are separately operable by means of the controls 40, as it may be necessary to drive one of these units in one direction, while driving the other unit in the opposite direction, such as when the mobile drive unit is being turned, as is well known in the art with respect to mobile units mounted upon crawler chains. The hydraulic fluid will therefore be reversibly controlled by the control unit 40 for reversibly feeding the hydraulic fluid through the lines 43, 44, 49 and 50.

The crawler chain drive means 48 and 54 are identical, and therefore only one of these units will be described, identical reference characters being applied to the other. These drive means each include a worm type gear reducer 56 that is supported upon a mounting plate 58 that is pivotally supported upon the frame 10. A pivotal support 59 is provided at one end of the mounting plate 58, for supporting the same upon the frame 10, and an adjustable lug 60 is provided at the other end of the mounting plate 58, for adjusting the pivotal motion of the mounting plate 58, for a purpose to be subsequently described. The gear reducer 56 is connected to the drive shaft of the hydraulic motor by means of a drive coupling 62. A power take-off sprocket 64 is provided upon the gear reducer 56 and a sprocket 66 is provided upon the shaft 67 which supports the front end of the crawler chain 12, and a drive chain 68 is entrained about the sprockets 64 and 66, for the transmission of power from the sprocket 64 to the sprocket 66. The pivotal mounting of the plate 58 upon the frame 10, that has been previously described, is provided for the purpose of tensioning the drive chain 68. Inasmuch as these sprocket and chain connections will be disposed to the outermost sides of the machine, I preferably provide a cover plate 70 over the same so that they will not be exposed.

The flexible traveling chain and flight conveyor D preferably includes an endless conveyor chain 72 comprising block links 73, side bars 74, and chain pins 75, together with flights 76 carried by the chain.

The chain and flight conveyor drive means 26 preferably includes a gear reducer 78 that is operably connected to the prime mover 15 by means of a coupling 79 and is provided with a power take-off shaft 80 upon which is mounted a sprocket 81. A driving connection 82 for the chain and flight conveyor D is mounted upon the frame 10, the same including a transversely extending drive shaft 83 carried by bearings 84 of any approved character; a chain drive sprocket wheel 85 being secured and positioned upon the drive shaft 83 for engagement with the chain 72 of the chain and flight conveyor D. Mounted upon one end of the drive shaft 83 is a sprocket 87 that is connected, by means of chain 89 entrained thereabout, to the drive sprocket 81 of the gear reducer 78. A guard 90 may be provided about the sprocket 87 and chain 89, in order to protect an operator from contact with the moving parts.

Figure 2:
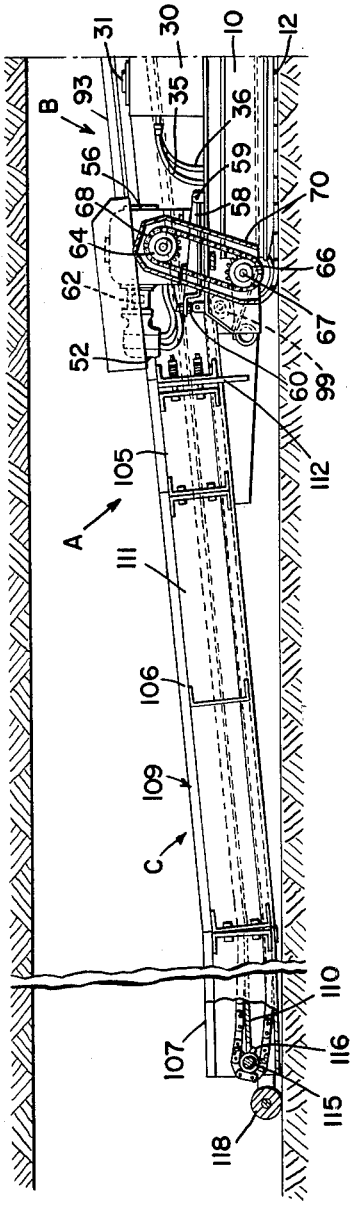

The frame 10 preferably includes a trough 92 having upwardly inclined sides 93 and a bottom plate 94. Longitudinally extending side plates or stringers 95 extend below the bottom plate 94, comprising a deep web upon which are supported various chain drive and idler elements, as will be subsequently described. The trough 92 and the stringers 95 extend outwardly from the frame 10 toward the belt tailpiece E for a substantial distance, as shown in Fig. 2ᵃ, and extend from the frame 10 toward the pan units C for a short distance, as shown in Fig. 2. The chain drive sprocket 85 is supported over the belt tailpiece E by the stringers 95, and extends above the bottom plate 94, through a slot 96 provided therein, as will be seen from Fig. 3. The teeth of the sprocket 85 extending above the bottom plate 94 engage the links of the chain 72 and drive the chain and flight conveyor D.

The conveying reach of the chain and flight conveyor D will be supported upon the bottom plate 94; however, it is necessary to provide supports for the return reach of the chain and flight conveyor D as it passes through the mobile drive unit. Two such supports for the return reach of the chain and flight conveyor D are provided, the support 98 being mounted upon the stringers 95, adjacent the belt tailpiece E, and a second support 99 being mounted upon the stringers 95 adjacent the pan units C. These supports 98 and 99 each comprise an idler roller 100 mounted upon a shaft 101 which is supported for free rotative movement by the bearings 102 connected to the stringers 95. The return reach of the chain and flight conveyor D is slack between the supporting units 98 and 99, assuming a somewhat catenated position, the weight of the chain in this slack portion acting as a gravity take-up for the conveying reach of the chain, maintaining the flights thereof in contact with the bottom plate 94 and the chain in mesh with the chain drive sprocket.

The pan units C preferably comprise a first pan section 105 secured to the mobile drive unit D; a plurality of intermediate pan sections 106; and a tail pan section 107. These pan sections 105, 106 and 107 may be of the type disclosed in the patent to A. R. Long and J. B. Long, No. 2,420,085, dated May 6, 1947, providing an upper trough 108 for the conveying reach of the chain and flight conveyor, the uppermost edges of the trough 108 providing a trackway 109 for movement thereupon of an elongated intermediate transfer conveyor, such as that shown and described in the patent to J. B. Long and R. J. Fry, No. 2,747,721, dated May 29, 1956; the bottom supporting plate 110 supporting the conveying reach of the chain and flight conveyor; and having side stringer sections 111. The front pan section 105 is connected to the trough 92 of the mobile drive unit B by means of a resilient pivotal connection 112 so that the pan section 105 may flex slightly with respect to the trough 92.

The tail pan section 107 is provided with a shaft 115 that supports an end sprocket wheel 116 about which is entrained the chain 72. This tail pan section 107 is provided with a roller 118 which extends outwardly beyond the end of the tail pan section 107 and supports the tail pan section 107 spaced slightly above the ground floor. The pan units C thus extend from the mobile unit B for a substantial distance and are positioned adjacent the ground floor so that an elongated intermediate transfer conveyor as previously described may be mounted thereupon for discharge of a load thereinto, even in low ceiling mines.

The frame 10, adjacent the crawler chains 12, is provided with a pair of opposed pivot plates 120, for attachment thereto of the belt tailpiece E; the sides 93 of the trough 92 are provided with lugs 121 for cooperative attachment with the belt tailpiece E; and the frame 10 is also provided with two pairs of lugs 123 and 124 for cooperation with the belt tailpiece E, all as will be subsequently described.

The belt tailpiece E preferably comprises a frame including a pair of side members 125 and 126, each of these side members including a supporting skid 128 at one end thereof and a supporting stand 129 at the other end thereof; a lower supporting brace 130 extending between the side member 125 and 126 adjacent the supporting skid 128; a lower supporting cross brace 131 extending intermediate the side members 125 and 126 adjacent the supporting stand 129; a plurality of upper cross braces 133, 134 and 135 extending transversely intermediate the side members 125 and 126; and an intermediate cross brace 136 extending between the side members 125 and 126, adjacent the lowermost portion of the cross brace 135. Each of the cross braces 133, 134 and 135 are provided with inclined end portions 138 and 139 and a central portion 140 that is positioned below the endmost connection thereof to the side sections 125 and 126. The inclined side portions 138 and 139 of the cross brace 134 are at a slightly increased angle from those of the cross brace 133, the central portion 140 of the cross brace 134 extending at a greater distance below the endmost edges thereof than the central portion 140 of the cross brace 133; and the side portions 138 and 139 of the cross brace 135 are inclined at still a greater angle than the side portions 138 and 139 of the cross brace 134, the central portion 140 of the cross brace 135 extending even lower below the endmost portions thereof than the central portion 140 of the cross brace 134. These cross braces are thus designed to serve as slide plates for the belt and to gradually increase the troughing of the belt of the extensible conveyor F, as will be subsequently described.

Welded, or otherwise secured to the side members 125 and 126 is a tongue 143. This tongue 143 includes convergent side pieces 142 that support a socket flange 145; an upper plate 146; and a cross brace 147. The socket flange 145 is provided for insertion between the supporting flanges 120 of the mobile drive unit B, wherein it is secured by means of a retaining pin 149, providing a pivotal securement of the belt tailpiece E to the mobile drive unit B.

Mounted intermediate the side members 125 and 126, beneath the cover plate 146 of the tongue 143, is a face fluted pulley 150. This face fluted pulley 150 extends between the side members 125 and 126 and is supported thereupon by bearing mounts 152. This pulley is freely rotatable in accordance with the movement of the belt of the extensible conveyor F. An L-shaped cross brace 154 is mounted upon and extends between the side members 125 and 126, adjacent the pulley 150, the uppermost leg of the brace 154 forming a support for the belt as it leaves the pulley 150.

Return roller brackets 155 are provided upon the frames 125 and 126, spaced from the pulley 150, and adjacent the supporting skids 128, which supporting brackets 155 support a return roller 157 which supports the return reach of the belt of the extensible conveyor E.

The side members 125 and 126 are provided with vertical slots 160, adjacent the supporting stands 129, and a shaft 161 is supported within the slots 160, extending between the side members 125 and 126. Pivotally supported upon the shaft 161 is a belt wiper 163. This belt wiper rides along the uppermost surface of the return reach of the belt so that any debris that may have been deposited thereupon during the travel of the return reach of the belt below the conveying reach of the belt will be wiped off. The belt wiper 163 is vertically movable within the confines of the slots 160, and is pivotally movable about the shaft 161, so that it will freely ride upon the uppermost surface of the return reach of the belt.

A loading plate 165 is mounted upon the uppermost portion of each of the side members 125 and 126, extending over the belt of the belt conveyor and with the ends thereof extending over the belt being inclined slightly downwardly. These loading plates 165 are provided so that any material that may be discharged from the chain and flight conveyor D and is not directly in line with the central portion of the belt will fall upon the loading plates and be directed to a proper position upon the belt.

Secured to the side frames 125 and 126, adjacent the supporting stands 129, are a pair of spaced flanges 168 defining ears 170 and 171. Aligning means 172 is connected at one end thereof to the ear 170 of the belt tailpiece E, and at the other end thereof to the flanges 123 of the mobile drive unit B; and aligning means 173 is connected at one end thereof to the ear 171 of the belt tailpiece E and at the other end thereof to the flanges 124 of the mobile drive unit B. The aligning means 172 and 173 are cooperatively operable to properly align the belt tailpiece E with the mobile drive unit B, so that a load will be discharged from the mobile drive unit B to its proper position upon the belt. In the form of invention shown in the drawings I have shown the aligning means 172 and 173 as comprising a ratchet type of jack having one threaded end section 175, a second end section 176, and an intermediate connecting section 177. The connecting section 177 is threaded to receive the end sections 175 and 176 and a ratchet 178 and handle 179 are provided upon the central section 177 for the turning thereof. The end sections 175 and 176 and the central section 177 form an extensible and retractable rigid connection between the belt tailpiece E and the mobile drive unit B, and it will be readily seen that by proper manipulation of the handles 179 and extension or retraction of the side units 175 and 176, that the belt tailpiece can properly be aligned with the mobile drive unit B.

Mounted upon the loading plates 165, at the opposite end of the belt tailpiece from the tongue 143, are a pair of diversion plates 182. These diversion plates extend for a substantial distance above the loading plates and are convergent at the ends thereof most remote from the tongue 143, forming substantially a funnel upon the loading plates 165, so that any material that may be discharged from the mobile drive unit, and which may overlap the loading plates 165 will be guided by the diversion plates 182 to a proper position upon the belt. A lug 184 is provided adjacent the outermost edge of each of the diversion plates 182.

The normal operating position of the belt tailpiece E will be with the supporting stand 129 raised from the ground surface, the tongue 143 supporting one end of the tailpiece on the mobile drive unit B and the supporting skid 128 resting on the ground surface and supporting the other end of the tailpiece, the supporting stand 129 only being used when the tailpiece is disconnected from the mobile drive unit.

In the tramming of the mobile drive unit and belt tailpiece it is desirable to lift the supporting skid 128 from contact with the ground and I therefore provide lift means 186 interconnected between the flanges 121 of the mobile drive unit B and the flanges 184 of the belt tailpiece E. In the form of invention herein shown, referring particularly to Figs. 1ª and 2ª, I have shown the lifting means 186 as being a conventional throw type of jack, the same including an arm 190 attached to a flange 121, a handle 191 pivotally secured to the arm 190, and a link 192 secured to the handle and attached to a flange 184. Upon throwing of the handle 191 the link 192 will be moved toward the arm 190, thereby lifting the end of the tailpiece E from the ground, and when it is desired to lower the same the handle is merely moved in the opposite direction.

The extensible conveyor F is preferably of the type, disclosed in copending application Serial Number 700,444, filed December 3, 1957, now Patent No. 2,896,774, of which myself and J. C. Clay are co-inventors, wherein a belt 197 is supported by a plurality of conveying idler rollers 198 that are, in turn, flexibly supported upon a pair of spaced flexible side strands 200. Roof jacks 202, each having a strand clamp 203 secured thereto may be utilized for tying off the flexible strands 200. In the tying off of these flexible strands I may entrain each of the strands about a sheave 205 that is supported upon the belt tailpiece E, as shown in Figs. 1ª and 2ª, the strands leading from the sheave to a spool upon which they are stored. In this respect, when the conveyor is extended, the flexible strands will be continuously fed through the sheaves 205 in a position to have the carrying idlers 198 attached thereto.

It will be seen that the return reach of the belt 197 is supported over the return roller 157 of the belt tailpiece E, extends about the fluted pulley 150, with the conveying reach thereof extending from the pulley 150 and entrained over the cross brace 154, and thence over cross braces 133, 134 and 135, which cross braces 133, 134 and 135 are a troughlike shape, as previously described, so that the belt as it passes thereacross is substantially preformed into a trough for abutment with the carrying idlers 198. Any conventional driving head for movement of the belt may be used.

Assuming that the mobile drive unit B and belt tailpiece E are properly positioned to form a continuous longitudinally extending conveyor, and it is now desirable to move the mobile drive unit forward and to extend the belt conveyor F the operation is as follows:

The chain and drive unit 26 is deactivated, stopping the motion of the chain and flight conveyor, and the hydraulic pump is activated, providing drive power to the crawler chains 12. The belt is separated, preferably adjacent the belt handling apparatus as described in my copending application filed March 16, 1959; an additional length of belting attached, as previously described in the aforesaid application for Belt Handling Apparatus filed March 16, 1959; the lift means 186 is operated, lifting the supporting skid 128 from the ground; and the mobile drive unit is then trammed forward to its new position. The forward movement of the mobile drive unit D and attached belt tailpiece E will pull the added belting from its spool and will pull additional lengths of the flexible strands from their spools, the tramming operation continuing until the belt has been completely unspooled, whereupon the belt is spliced into position and properly tensioned. The flexible strands along each side of the belt conveyor are then positioned and the carrying idlers 198 are positioned below the conveying reach of the belt. The lift means 186 are then lowered, so that the supporting skid 128 rests upon the ground floor, and the belt tailpiece and the mobile drive unit are then aligned by the aligning means 173, so that the mobile drive unit and belt form a continuous longitudinally extending conveyor unit. The belt conveyor is then started and any final adjustment that may be necessary with respect to the alignment may be taken care of. The mechanism is now in position for operation at the new location.

When it is desired to retract the extensible conveyor F the reverse procedure from that above described will be followed.

Although the elongated discharge conveyor A and the extensible belt conveyor F are preferably aligned to form a continuous longitudinally extending conveyor, it will be obvious that the belt tailpiece E, which must be in alignment with the extensible conveyor F, may be disposed at a slightly angled position with respect to the chain and flight conveyor D by adjustment of the aligning means 172 and 173.

Various changes may be made to the form of the invention herein shown and described without departing from the spirit of the invention or the scope of the following claims.

I claim:

1. In conveying mechanism the combination of a mobile drive unit and a conveyor attaching tailpiece, said mobile drive unit including drive means for the tramming thereof, a frame, a trough mounted on said frame and extending outwardly to either end of said frame, a plurality of pan sections attached to one end of said trough, the endmost of said pan sections outwardly from said mobile drive unit having a ground engaging wheel for supporting said pan sections substantially above the ground surface, a flexible conveyor assembly mounted within said trough and extending through said pan sections, drive means for the rotation of said conveyor assembly mounted within said trough, and idler roller means mounted upon the endmost of said pan sections for supporting the end of said flexible conveyor opposite said trough, means interconnecting said mobile drive unit and said conveyor attaching tailpiece with the end of said trough opposite the attachment thereto of said pan sections extending over said conveyor attaching tailpiece, a conveyor belt attached to said conveyor attaching tailpiece, lift means interconnecting said mobile drive unit and said conveyor attaching tailpiece for maintaining said tailpiece in juxtaposition with respect to said mobile drive unit during the tramming thereof and means interconnecting said mobile drive unit and said conveyor attaching tailpiece for aligning said conveyor belt attached to said conveyor attaching tailpiece with said flexible conveyor assembly of said mobile drive unit.

2. In a conveying mechanism the combination of a mobile drive unit having a receiving end and a discharge end; a conveyor attaching tailpiece secured to said mobile drive unit and extending beneath the discharge end of said mobile drive unit, said conveyor attaching tailpiece including a frame having a pair of opposite side members, an idler pulley mounted at one end of said frame transversely between said members and rotatably supported thereby, and slide plate means for slidably supporting a belt, said slide plate means comprising a plurality of rigid cross braces fixedly secured to and extending transversely between said side members and spaced longitudinally along said conveyor attaching tailpiece from said idler pulley to the opposite end of said conveyor attaching tailpiece from said pulley, each of said cross braces having downwardly angled side portions and a horizontal central portion, each of the central portions thereof of succeeding cross braces being spaced at a lower height from the preceding cross brace, in stepped relationship from the end of said conveyor attaching tailpiece having said idler pulley mounted thereon to the other end thereof, the side portions of said cross braces being downwardly angled at increasing angles from said side members to said central portions, the angles thereof increasing from the cross brace adjacent said idler pulley to the cross brace adjacent the opposite end of said conveyor attaching tailpiece; and means interconnecting said mobile drive unit and said conveyor attaching tailpiece for maintaining said conveyor attaching tailpiece in juxtaposition with respect to said mobile drive unit.

3. In conveying mechanism the combination of a mobile drive unit having a receiving end and a discharge end; a unitary conveyor assembly mounted on said mobile drive unit; a conveyor attaching tailpiece pivotally secured to said mobile drive unit, said conveyor attaching tailpiece extending beneath the discharge end of said mobile drive unit and having its pivotal interconnection with said mobile drive unit centrally with respect to the transverse width of said unitary conveyor assembly, conveyor attaching tailpiece aligning means pivotally secured to each side of said conveyor attaching tailpiece and pivotally secured to said mobile drive unit outwardly of and spaced from said unitary conveyor assembly, said aligning means being independently operable for step by step aligning of said conveyor attaching tailpiece with respect to the discharge end of said mobile drive unit; and lift means interconnecting said mobile drive unit and said conveyor attaching tailpiece, said lift means having one end thereof pivotally attached to said conveyor attaching tailpiece adjacent the end thereof opposite the pivotal attachment of said conveyor attaching tailpiece with said mobile drive unit, and the other end of said lift means being attached adjacent the outermost portion of the discharge end of said mobile drive unit, said lift means being operable to instantaneously lift the end of said conveyor attaching tailpiece opposite its attachment to said mobile drive unit to a predetermined height.

4. In conveying mechanism the combination of a mobile drive unit, said mobile drive unit including drive means for the tramming thereof; a conveyor attaching tailpiece secured adjacent one end of said mobile drive unit, said conveyor attaching tailpiece including a frame having a pair of side members, a pair of loading plates one of which is connected to the uppermost portion of each of said side members, said loading plates extending inwardly toward the longitudinal center of said conveyor attaching tailpiece, with the innermost edges thereof being spaced apart a substantial distance to permit the flow of material therebetween, a guide plate mounted on each of said loading plates at the opposite end of said conveyor attaching tailpiece from the end thereof secured to said mobile drive unit, each of said guide plates being angled convergently toward the longitudinal center of said conveyor attaching tailpiece; aligning means interconnecting said mobile drive unit and said conveyor attaching tailpiece for maintaining said conveyor attaching tailpiece in juxtaposition with respect to said mobile drive unit; and lift means interconnecting said mobile drive unit and said conveyor attaching tailpiece for maintaining said tailpiece in juxtaposition with respect to said mobile drive unit during the tramming thereof.

References Cited in the file of this patent

UNITED STATES PATENTS

| 1,481,152 | Rehbein | Jan. 15, 1924 |
| 2,016,994 | Fleming | Oct. 8, 1935 |
| 2,670,836 | Ball | Mar. 2, 1954 |
| 2,788,114 | Russell | Apr. 9, 1957 |
| 2,796,969 | Russell | June 25, 1957 |
| 2,858,933 | Hardy | Nov. 4, 1958 |

FOREIGN PATENTS

| 423,449 | Great Britain | Feb. 1, 1935 |